United States Patent
Friedrich et al.

(10) Patent No.: US 12,097,612 B2
(45) Date of Patent: Sep. 24, 2024

(54) MODULAR GRIPPING FINGER, GRIPPING DEVICE AND CONSTRUCTION KIT

(71) Applicant: SCHUNK GmbH & Co. KG Spann- und Greiftechnik, Lauffen am Neckar (DE)

(72) Inventors: Christian Friedrich, Gundelsheim (DE); Jürgen Fleischer, Karlsruhe (DE); Marco Friedmann, Karlsruhe (DE)

(73) Assignee: SCHUNK GmbH & Co. KG Spann -und Greiftechnik, Lauffen am Neckar (DE)

( * ) Notice: Subject to any disclaimer, the term of this patent is extended or adjusted under 35 U.S.C. 154(b) by 162 days.

(21) Appl. No.: 17/604,580

(22) PCT Filed: Apr. 20, 2021

(86) PCT No.: PCT/EP2021/060185
§ 371 (c)(1),
(2) Date: Oct. 18, 2021

(87) PCT Pub. No.: WO2021/214030
PCT Pub. Date: Oct. 28, 2021

(65) Prior Publication Data
US 2023/0030444 A1 Feb. 2, 2023

(30) Foreign Application Priority Data
Apr. 20, 2020 (DE) ............. 10 2020 110 692.0

(51) Int. Cl.
*B25J 15/04* (2006.01)

(52) U.S. Cl.
CPC ................. *B25J 15/0475* (2013.01)

(58) Field of Classification Search
CPC .... B25J 15/0475; B25J 15/0466; B25J 15/08; B23P 19/04; B25B 11/02
(Continued)

(56) References Cited

U.S. PATENT DOCUMENTS 4,699,414 A * 10/1987 Jones ............... B25J 15/026
294/902
4,946,380 A * 8/1990 Lee .................. A61F 2/583
623/64
(Continued)

FOREIGN PATENT DOCUMENTS

AT 0021039 A4 10/2019
DE 3705884 A1 9/1988
(Continued)

OTHER PUBLICATIONS

German Office Action, pp. 1-12.

*Primary Examiner* — Paul T Chin
(74) *Attorney, Agent, or Firm* — BOND, SCHOENECK & KING, PLLC; George R. McGuire (57) ABSTRACT

Modular gripping finger for arrangement on a movable gripper jaw of a gripping device, having at least two rigidly interconnected finger modules, the finger modules including one or more base modules for forming a geometric shape of the gripping finger and including an end module having a gripping surface, the end module including an electrical end module interface and at least one sensor which is or can be connected to the end module interface.

14 Claims, 3 Drawing Sheets

(58) Field of Classification Search
USPC .................................................. 294/106, 213
See application file for complete search history.

(56) References Cited

U.S. PATENT DOCUMENTS

| | | | | |
|---|---|---|---|---|
| 5,256,128 | A * | 10/1993 | Neumann | B23Q 1/0063 |
| | | | | 901/41 |
| 5,437,490 | A * | 8/1995 | Mimura | B25J 9/102 |
| | | | | 294/907 |
| 7,445,260 | B2 * | 11/2008 | Nihei | B25J 15/08 |
| | | | | 901/34 |
| 9,975,253 | B2 * | 5/2018 | De Castelbajac | B25J 15/0475 |
| 10,195,745 | B2 * | 2/2019 | De Castelbajac | B25B 11/02 |
| 2007/0063523 | A1 * | 3/2007 | Koyama | B25J 15/0009 |
| | | | | 294/106 |
| 2017/0066142 | A1 | 9/2017 | De Castelbajac et al. | |
| 2018/0141209 | A1 | 5/2018 | Lee et al. | |

FOREIGN PATENT DOCUMENTS

| | | |
|---|---|---|
| DE | 102014014843 A1 | 4/2016 |
| DE | 102016200492 A1 | 7/2017 |
| DE | 102017107446 A1 | 10/2018 |
| JP | 06180258 A | 6/1994 |
| WO | 2015139717 A1 | 9/2015 |
| WO | 2017140749 A1 | 8/2017 |
| WO | 2018187704 A1 | 10/2018 |

* cited by examiner

MODULAR GRIPPING FINGER, GRIPPING DEVICE AND CONSTRUCTION KIT

CROSS REFERENCE TO RELATED APPLICATIONS

This is a National Stage Application filed under 35 U.S.C. 371 based on International Patent Application No. PCT/EP2021/060185 filed on 20 Apr. 2021, which claims priority to German Application Number 10 2020 110 692.0, filed Apr. 20, 2020, the disclosure of each of which is incorporated herein by reference in its entirety.

BACKGROUND

The invention relates to a modular gripping finger for a gripping device, to a gripping device having a modular gripping finger and to a construction kit for providing a modular gripping finger. The gripping finger can be arranged on a movable gripper jaw of the gripping device. The gripping finger comprises at least two finger modules rigidly connected to one another, the finger modules comprising at least one base module and an end module. The end module has a gripping surface which serves as a contact surface for contacting a gripped part. The base module substantially maps a geometric shape of the gripping finger, a different geometric shape of the gripping finger being achieved by arranging different base modules.

A modular gripping finger to be arranged on a gripper jaw of a gripping device having a plurality of finger modules arranged one behind the other and an associated construction kit are known from the FINGERKIT from Weiss Robotics GmbH & Co. KG, 71640 Ludwigsburg (see https://weiss-robotics.com/fingerkit/). The gripping finger can be reconfigured and is assembled from different finger modules of a kit for a specific component, so that a large number of components can be individually gripped by using differently designed gripping fingers. The finger modules are intended exclusively for gripping a component and for producing a force flow between the gripping surface and the gripper jaw.

It is also known from DE 10 2016 200 492 A1 to at least partially integrate sensors into a gripping finger, the gripping finger used being designed in one piece and individually for the gripping situation. The gripping finger does not have a modular design and consequently cannot be reconfigured, so that a different gripping finger has to be used in a different gripping situation.

A two-part gripping finger having a tip and a module is known from US 2017/0066142 A1, a sensor being disclosed in the tip and an electrical evaluation unit being disclosed in the module, i.e. within the gripping finger.

The object of the invention is to provide a modular gripping finger having an integrated sensor, wherein the evaluation of the sensor signals is to be carried out in a favorable manner.

SUMMARY OF THE INVENTION

The object is achieved by a modular gripping finger attached to a movable gripper jaw of a gripping device. The gripping finger consequently comprises at least two interconnected finger modules with at least one base module and one end module, the finger modules being rigidly connected to one another, i.e. frictionally, captively and/or torsionally rigidly. The end module comprises an electrical end module interface and at least one sensor which is or can be connected to the end module interface. The sensor in the end module is or can be connected to the end module interface via a line provided within the end module. The line is provided in such a way that sensor data acquired by the sensor can be transmitted at least to the end module interface and energy for operating the sensor can be transmitted from the end module interface to the sensor. In addition to the sensor, an actuator can be provided in the end module, a connection to the end module interface being established via the line. Energy for operating the actuator and data for controlling the actuator can be transferred.

According to the invention, each base module comprises a front electrical interface, which is facing the gripper jaw, and a rear electrical interface, which is facing away from the gripper jaw. The terms "facing" and "facing away from" define a local orientation, the finger modules forming a chain, starting at the jaw interface, which ends with the end module as the last link in the chain. The interface facing the gripper jaw is thus arranged in the chain upstream of the interface facing away from the gripper jaw.

A base module can be connected via its rear interface to the end module interface. The gripper jaw comprises a jaw interface on the gripper jaw side for arranging the gripping finger. If only one base module is arranged between the jaw interface and the end module interface, the gripping finger consists of two finger modules. With each additional base module arranged between the end module interface and the jaw interface, the number of finger modules of the gripping finger increases by one. Furthermore, the front electrical interface of the at least one base module and the electrical end module interface are identical.

One or more connecting lines for transmitting energy and data are provided within each base module, each of which lines extends along the length of the base module or between the front interface and the rear interface. The connecting lines of all the base modules arranged between the jaw interface and the end module interface form a through line in which the connecting lines of two base modules arranged directly one behind the other are connected via the interfaces provided therebetween. The through line is designed in such a way that energy for operating the sensor and/or sensor data generated by the sensor can be transmitted between the jaw interface and the end module interface. In addition to the data from the sensor, the information from all currently installed finger modules and their sequence in the chain can also be transmitted via the connecting line or the through line.

The finger modules preferably comprise a coding, so that an evaluation unit on the gripper side and/or a higher-level gripping controller knows the geometry and functionality of the gripping finger after the gripping finger has been connected to the jaw interface. As a result, the evaluation unit and/or the gripping controller in particular know the zero point of the gripping finger and/or the gripper.

Such a gripping finger allows data to be acquired without attaching additional peripherals to the gripping finger. The arrangement of the connecting lines within the base modules also reduces the risk of entanglement in the connecting lines and increases the working area of the gripping finger. Furthermore, the gripping finger can be individually adapted to a gripping situation by arranging other and/or further base modules on the gripping finger without impairing the functionality of the gripping finger with regard to data acquisition. A gripping finger composed of modular finger modules can form any finger kinematics. In addition, for example, a sensor can be exchanged by exchanging the end module, while the other base module or modules can remain on the gripping finger.

In addition, the sensor data acquired in the gripping finger can be transmitted to the gripper jaw by means of the through line, so that an evaluation unit on the gripper side can evaluate the sensor data. Consequently, no further evaluation unit which would lead to a latency between the two evaluation units is required in the gripping finger.

The finger modules advantageously comprise an adapter module, the adapter module comprising a front electrical interface and a rear electrical interface. The adapter module can be connected via its front electrical interface to an electrical jaw interface on the gripper jaw side. The front electrical interface of the adapter module is preferably adapted to the gripper jaw and/or the jaw interface. The rear electrical interface of the adapter module and the rear electrical interface (18b) of the at least one base module (12a, 12b) are identical. The adapter module can be connected via its rear electrical interface to the front electrical jaw interface of a base module or to the end module interface. The at least one base module and/or the end module can preferably be connected to the electrical jaw interface by means of the adapter module. The modular gripping finger preferably comprises an adapter module and an end module and in particular at least one base module. Accordingly, the modular gripping finger can be arranged at different jaw interfaces. Due to the identical design of the rear interfaces of the adapter module and the at least one base module, any number of base modules can be arranged on the adapter module in order to design a geometry and/or functionality of the gripping finger.

One or more connecting lines for transmitting energy and data are provided within the adapter module, which lines extend between the front interface and the rear interface of the adapter module. The connecting line of the adapter module extends the through line, as the connecting line of the base module arranged on the adapter module is connected via the interfaces provided between these two.

Alternatively, the rear interface of the base modules and the jaw interface are identical in each case. The base modules can therefore be exchanged in any order. Accordingly, there is no need to provide an adapter module at the jaw interface which comprises a front interface adapted to the jaw interface.

It is also conceivable that the front interface of the base module arranged at the jaw interface is adapted to the jaw interface. In this case, adapter base modules are provided for different jaw interfaces, which base modules are arranged at the jaw interface. One or more base modules or an end module can be arranged on the adapter base module. The front interfaces of the further base modules, with the exception of the adapter base module, are each identical to the end module interface. The rear interfaces of all the base modules are identical.

A development of the invention provides one or more sensors and/or one or more actuators in one or more base modules. The sensors and/or actuators provided in one or more base modules can be connected to the connecting line or the through line, so that a connection to the jaw interface can be established. As a result, the functionality of the gripping finger can also be expanded, in particular if there is no space available in the end module for expanding the sensor system.

At least one sensor is advantageously designed to record the gripping force exerted on the gripping surface by a gripped part. Control can thus be carried out by a gripping controller depending on the gripping force. Furthermore, at least one sensor can detect the position of the gripping surface in space in order to allow improved orientation of the gripping finger. Furthermore, at least one sensor can detect the distance between the gripping surface and a part to be gripped, so that a part to be gripped can be approached at increased speed. Furthermore, at least one sensor can detect the slippage between the gripping surface and the gripped part, so that slipping of the gripped part is detected by the evaluation unit and further slipping of the gripped part can be prevented by increasing the gripping force, for example. Furthermore, at least one sensor can detect environmental conditions, such as room temperature, air humidity and/or optical environmental features, in order to be able to map the gripping situation in detail. Furthermore, at least one sensor can be designed for identifying the component that is gripped and/or is to be gripped. It is conceivable that one or more functions for data acquisition are integrated in a sensor, a plurality of sensors also being able to be used for further functions. It is also conceivable that a plurality of sensors are used for one function.

An advantageous development of the gripping finger provides a media line within one or more base modules for transferring substances and/or media, the media line extending over the length of the one or more base modules or between the front interface and the rear interface. The front and rear interfaces are thus not only designed as electrical interfaces, but also as media interfaces. Furthermore, a media line can also be provided in the end module. The transfer of media allows pneumatic actuators, for example, to be operated, with the compressed air then being fed to the particular actuator by the gripping finger.

The base modules can advantageously be frictionally connected to one another, to the jaw interface and/or to the end module interface by means of a mechanical quick-change system. For example, the applicant's jaw quick-change system or a similar quick-change system for connecting comes into consideration. This allows the interface to be opened and closed quickly, or two finger modules to be connected to one another or two finger modules to be released from one another. In the connected state, a suitable force flow is achieved between the two finger modules.

In an advantageous development of the gripping finger, the components for the gripping finger are manufactured using additive manufacturing processes. Any complex geometries of the finger modules are possible using additive manufacturing processes. In addition, sensors and actuators can be embedded in the finger modules within the additive manufacturing process, so that an advantageous structure of the finger modules and an advantageous arrangement of the sensors or actuators in the finger modules can be implemented. It is also conceivable that the sensors or actuators are manufactured in a separate additive manufacturing process and then assembled with the finger modules.

Furthermore, it may be advantageous if the connecting lines are applied additively in or on the base module and the line in or on the end module. This results in a high level of reliability and a high degree of adaptability in the data transmission. It is also conceivable that the connecting lines are manufactured in a separate additive manufacturing process and then assembled with the finger modules.

An advantageous embodiment of the gripping finger provides a sensor in the end module which is designed in such a way that the spring travel of a spring coupled to the gripping surface is detected in order to record the gripping force acting on the gripping surface. The linear relationship between a force acting on a spring and the spring travel of the spring via the spring constant allows a direct conclusion to be drawn regarding the gripping force by measuring a change in the spring travel. In addition, there is simpler and better controllability of the gripper due to the flexibility in the gripping surface. Such a measuring device is simple to design and allows a compact construction of an end module.

In a further advantageous embodiment of the gripping finger, the end module, the at least one base module and optionally the adapter module are designed free of evaluation units. The design of the modular gripping finger is thus such that an evaluation unit that processes sensor data generated during operation of the at least one sensor, the end module and/or the at least one base module is not provided in or on the end module, nor in or on at least one of the base modules. If an adapter module is used, the adapter module also has no such evaluation unit. This has the advantage that even if a large number of finger modules are provided, only one evaluation unit has to be provided on the gripper side. This results in a simpler and more cost-effective design of the individual finger modules.

The object of the invention is also achieved by a gripping device according to claim 12 comprising an evaluation unit, comprising at least one jaw having a jaw interface and comprising at least one modular gripping finger according to the invention arranged at the jaw interface. The evaluation unit is integrated into the gripping device or arranged thereon; in particular, the evaluation unit is provided on or in the gripper housing or the gripper jaw. Two gripper jaws can be provided on the gripping device, a modular gripping finger being attachable to each gripper jaw. Alternatively, only one modular gripping finger and one non-modular gripping finger or a mating surface can be provided on the gripping device. The sensor data generated by the at least one sensor during operation can be processed by the evaluation unit, so that control of the gripping device is possible depending on the acquired sensor data.

The at least one sensor can preferably be connected to the evaluation unit by means of the jaw interface, in particular by means of internal connecting lines. As a result, the gripping finger can easily be connected to the jaw interface. Additional peripherals, such as an additional evaluation unit in the gripping finger or disruptive lines on the surface of the gripping finger, can thus be avoided.

Furthermore, the object of the invention is also achieved by a construction kit according to claim 14, the construction kit comprising various finger modules and serving to provide a gripping finger according to the invention. The finger modules contained in the kit are provided in different shapes, sizes and materials, so that a user can assemble the gripping finger individually based on the gripping situation and can also select a base module and/or end module with the appropriate sensor and/or actuator.

Further details and designs of the invention can be found in the following description, in which embodiments of the invention are explained in more detail.

DETAILED DESCRIPTION

Figure 1:
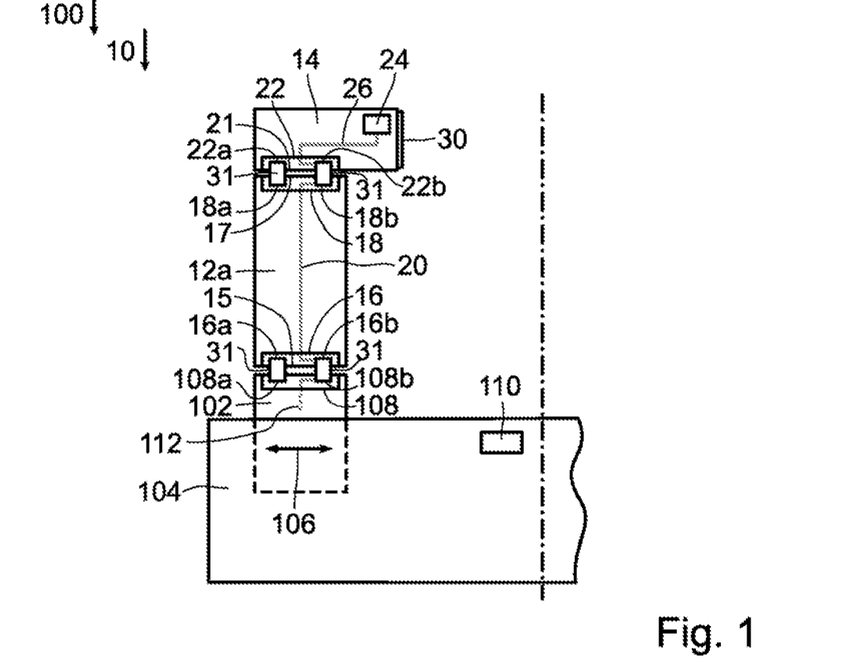
FIG. 1 is a schematic view of a gripping finger arranged on a gripper jaw with two finger modules.

FIG. 1 shows the left half of a gripping device 100 with a gripper jaw 102, the entire gripping device 100 having two gripper jaws 102 which can be moved toward and away from one another. A jaw interface 108 is provided on each of the gripper jaws 102, on each of which jaw interfaces a modular gripping finger 10 with at least two rigidly connected finger modules 12*a*, 12*b*, 14, 14*a*, 14*b* is arranged. The finger modules 12*a*, 12*b*, 14, 14*a*, 14*b* are formed by an end module 14, 14*a*, 14*b* having a gripping surface 30 and one or more base modules 12*a*, 12*b* for forming a geometric shape of the gripping finger 10.

The gripper jaw 102 is arranged partially inside and partially outside a gripper housing 104. Within the gripper housing 104, the gripper jaw 102 can be displaced with zero clearance in two directions along a straight line. The direction of movement 106 of the gripper jaw 102 is shown by the double arrow. The gripper jaw 102 has a jaw interface 108 on the side facing away from the gripper housing 104, the jaw interface 108 comprising a mechanical quick-change system 108*a* and an electrical interface 108*b*.

The base module 12*a* is designed as an elongate cuboid having a square base surface. Other shapes of the cross section and the longitudinal extension of the base module 12*a* are conceivable. The base module 12*a* comprises, on a front base surface 15, a front interface 16 with a mechanical quick-change system 16*a* and an electrical interface 16*b*. The front interface 16 interacts with the jaw interface 108, the mechanical quick-change systems 16*a* and 108*a* interacting and the electrical interfaces 16*b* and 108*b* interacting. The mechanical quick-change systems 16*a*, 108*a* serve to arrange the base module 12*a* in a captive manner on the jaw interface 108 and to establish a rigid connection between the base module 12*a* and the gripper jaw 102. The electrical interfaces 16*b* and 108*b* are used to transmit energy and data.

The base module 12*a* also comprises, on a rear base surface 17, a rear interface 18 with a mechanical quick-change system 18*a* and an electrical interface 18*b*.

A connecting line 20 is provided within the base module 12*a* between the front electrical interface 16*b* and the rear electrical interface 18*b*, so that the front electrical interface 16*b* is connected to the rear electrical interface 18*b* with regard to the transmission of energy, data and/or media. The connecting line 20 comprises one or more line sections and can supply one or more sensors 24 and/or one or more actuators 24. The connecting line 20 is arranged completely within the base module 12*a*, although the connecting line 20 can alternatively be arranged at least substantially within the base module 12*a*, i.e. enclosed by the base module 12*a*.

The end module 14 is also designed as an elongate cuboid having a square base surface and comprises an end module interface 22 with a mechanical quick-change system 22*a* and an electrical interface 22*b* on a side surface 21 of the cuboid. The end module interface 22 interacts with the rear interface 18 of the base module 12a, the mechanical quick-change systems 18a, 22a interacting and the electrical interfaces 18b and 22b interacting. The mechanical quick-change systems 18a, 22a serve to arrange the end module 14 in a captive manner on the rear interface 18 of the base module 12a and to establish a rigid connection between the base module 12a and the end module 14. Consequently, both the end module 14 and the base module 12a are rigidly connected to the gripper jaw 102. The electrical interfaces 18b and 22b are used to transmit energy and data.

A sensor 24 is provided within the end module 14. The sensor 24 is connected to the electrical end module interface 22b via a line 26. The line 26 is designed analogously to the connecting line 20 for transmitting energy, data and/or media. The connecting line 20 of the one base module 12a or the connecting lines 20 of a plurality of base modules 12a arranged one behind the other form a through line 28 which, in conjunction with the line 26 of the end module 14, connects the sensor 24 to the electrical jaw interface 108b. As a result, the sensor 24 can be supplied with energy and its sensor data can be transmitted via the line 26 and the through line 28 to the electrical jaw interface 108b. The generated sensor data can also be transmitted in lines 112 on the gripper side, which lines are shown dashed, and processed in an evaluation unit 110 and can thus be used for open-loop control and/or closed-loop control by means of a higher-level gripping controller of the gripping device 100, in particular for control of the gripping force and position.

The end module 14 further comprises a gripping surface 30, which is provided for gripping a part. In order to grip the part, the gripper jaws 102 are moved toward or away from one another in the gripping device 100 of FIG. 1 until the gripping surfaces 30 rest on the part to be gripped and a force flow is established between the two gripper jaws 102 by the gripping fingers 10 and the part to be gripped. The gripping surface 30 is formed in one piece with the end module 14. The gripping surface 30 can alternatively be provided as a separate component, in particular when an exchangeable gripping surface 30 with different materials is required. For an optimal gripping effect, the gripping surface 30 is made of a soft, dimensionally stable material with a high coefficient of friction, although any other material is also conceivable.

In the region of the interfaces 16, 18 of two base modules 12a arranged directly one behind the other, the base modules 12a have substantially the same cross section and, on the mutually facing base surfaces 15, 17, each partially forms a surface that is parallel to the other surfaces. This applies analogously to the side surface 21 of the end module 14 and the rear base surface 17 of the base module 12a arranged on the end module 14. The interfaces 108 and 16 as well as 18 and 22 comprise a plug as an electrical interface 108b, 16b, 18b, 22b, a positive plug being provided on the electrical jaw interface 108b and a negative plug being provided on the front electrical interface 16b. The rear electrical interface 18b and the electrical end module interface 22b are designed similarly to this. Alternatively, both interfaces 108b, 16b; 18b, 22b may be designed negatively and an intermediate element 31 may be provided for connection. With regard to the mechanical and electrical interface, a combination of both alternatives is also possible.

The electrical interfaces 108b, 16b, 18b, 22b can be expanded, for example by providing a further interface for media, to the extent that the interfaces 108b, 16b, 18b, 22b are each to be complementary to the electrical jaw interface 108b and the front electrical interface 16b as well as to the electrical end module sections 22b and the rear electrical interface 18b. This applies equally to a plurality of base modules 12a arranged one behind the other and their front and rear electrical interfaces 16b, 18b with respect to one another. In addition, the gripping finger 10 of FIG. 1 can be expanded by any number of additional base modules 12a that can be arranged between the jaw interface 108 and the end module interface 22. For improved handling, the edges of the finger modules 12a, 14 are designed with a chamfered edge of substantially 45°.

Figure 2:
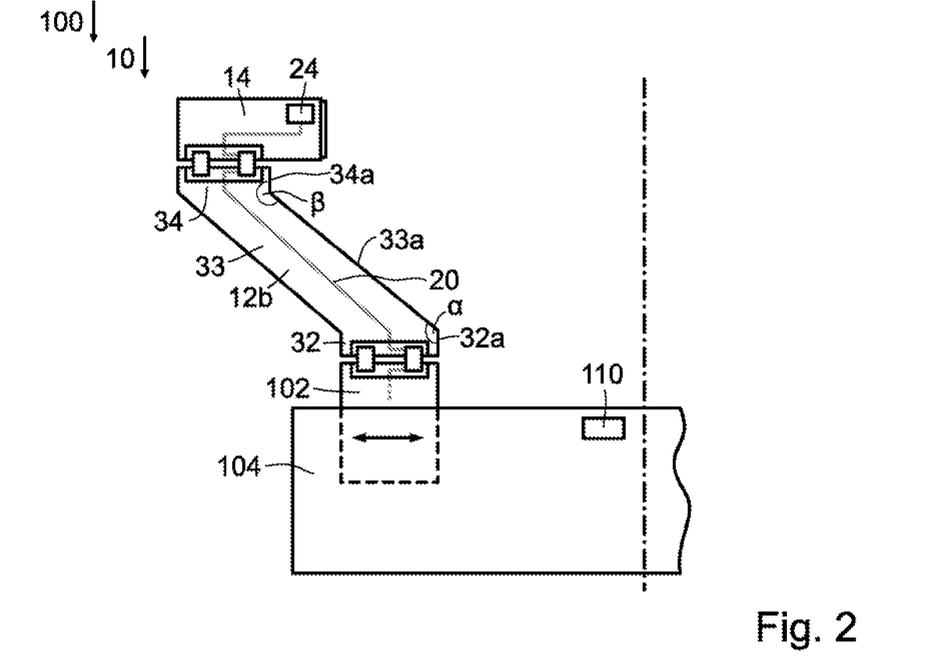
FIG. 2 is a schematic view of a gripping finger arranged on a gripper jaw with two finger modules as an alternative to FIG. 1.

FIG. 2 shows a further gripping finger 10 which differs from the gripping finger 10 of FIG. 1 by a different base module 12b. The base module 12b is double-angled and comprises a front region 32, a rear region 34 and a central region 33 arranged between the front region 32 and the rear region 34, the base module 12b being made in one piece. The front interface 16 is provided in the front region 32 and the rear interface 18 is provided in the rear region 34. The base module 12b has a square cross-sectional area over its entire longitudinal extension, the edges 32a, 34a of the base module 12b extending parallel to one another in the front region 32 and in the rear region 34. The edge 33a of the base module 12b in the central region 33a forms an angle $\alpha$ with the edge 32a which is in the range between 90° and 180°, and preferably in the range of 135°. The edge 33a forms an angle $\beta$ with the edge 34a which is in the range between 180° and 270°, and is preferably in the range of 215°.

Finger modules 12a, 12b, 14 having any shape are also conceivable, and the interfaces 16, 18 of the base modules 12a, 12b can also be arranged on the side surface 32, 33, 34 of the base module 12a, 12b and the end module interface 22 can be arranged on the base surface 23 of the end module.

Figures 3, 4:
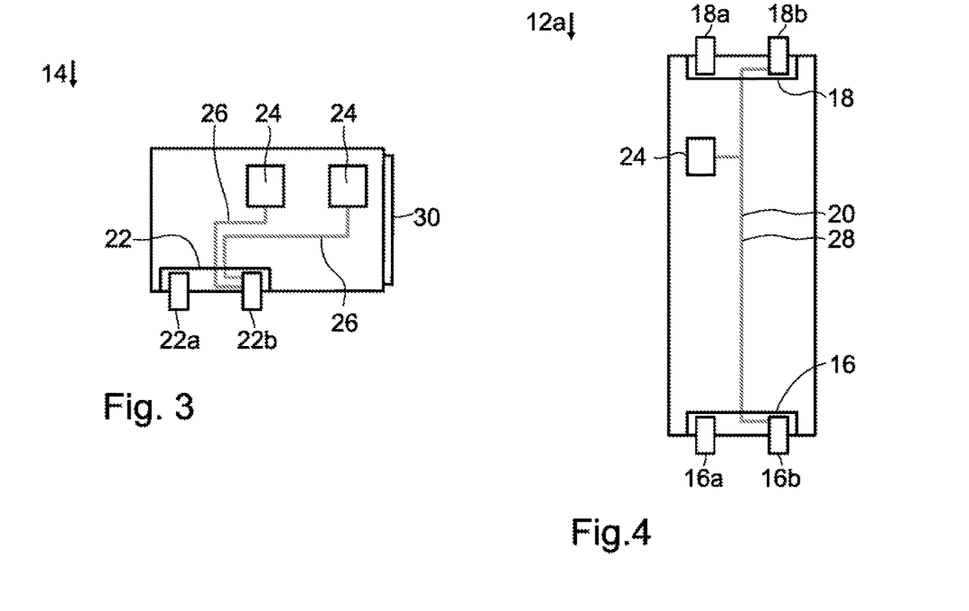
FIG. 3 is a schematic view of an end module that can be attached to the gripping finger of FIG. 1 or FIG. 2 with two sensors and an exchangeable gripping surface.
FIG. 4 is a schematic view of a base module that can be attached to the gripping finger of FIG. 1 or FIG. 2, with a sensor.

FIG. 3 shows an end module 14 with two sensors 24. The sensors 24 are each connected to the end module interface 22 via a line 26. By using an end module 14 according to FIG. 3, it is possible, for example, to monitor the slippage between the gripping surface 30 and the gripped part and to identify the gripped part using two different sensors 24 at the same time.

FIG. 4 shows a base module 12a with a sensor 24. The sensor 24 is integrated in the base module 12a and connected to the connecting line 20. Providing a sensor 24 in one of the base modules 12a may be expedient if there is no space for a further sensor 24 in the end module 14 used and the functionality of the gripping finger 10 is nevertheless to be expanded. Furthermore, the location for recording suitable data can be at any location in the kinematic gripper structure, for example in a base module 12a, so that arranging a sensor 24 in one of the base modules 12a can also be considered expedient.

Figure 5:
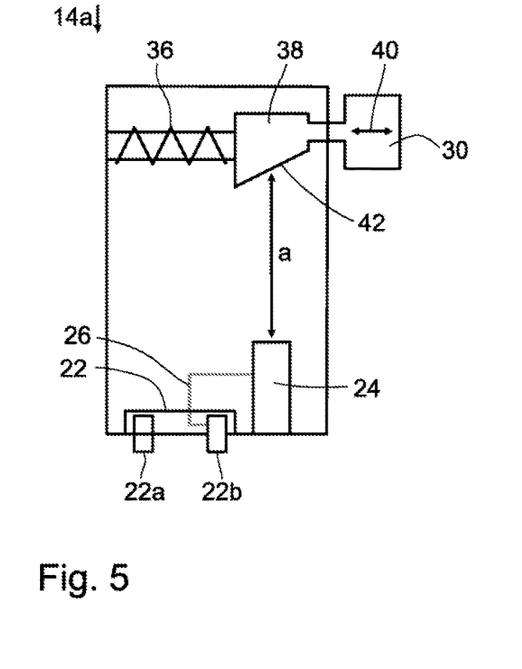
FIG. 5 is a schematic view of an end module that can be attached to the gripping finger of FIG. 1 or FIG. 2 with a sensor for recording the gripping force by detecting a spring travel.
Figure 6:
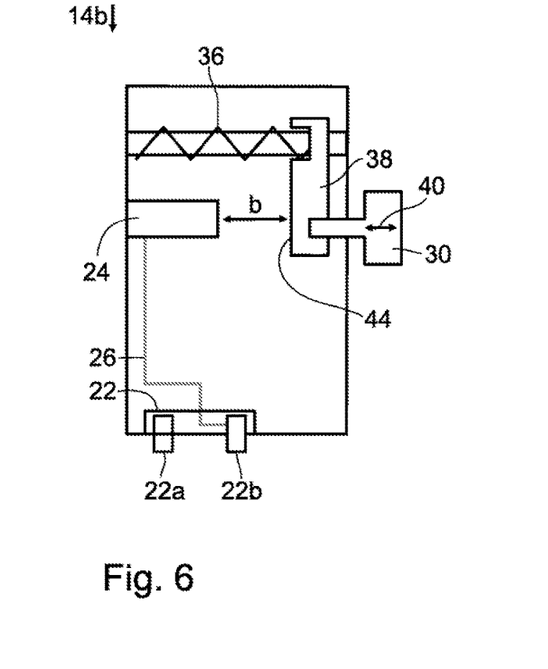
FIG. 6 is a schematic view of an end module, as an alternative to FIG. 5, that can be attached to the gripping finger of FIG. 1 or FIG. 2 with a sensor for recording the gripping force by detecting a spring travel.

FIGS. 5 and 6 each show an end module 14a, 14b with an integrated measuring device. A sensor 24 for determining the gripping force acting on the gripping surface 30 and a spring 36 coupled to the gripping surface 30 is provided in each of the end modules 14a, 14b. In order to determine the gripping force, the change in position of a measuring portion 38, which is also coupled to the gripping surface, is detected. The change in position of the measuring portion 38 takes place in the direction of movement 40 of the gripping surface 30. Since both the measuring portion 38 and the gripping surface 30 are coupled to the spring 36, the evaluation unit 110 of the gripping device 100 of FIG. 1 can, for example, determine the gripping force acting on the gripping surface 30 by means of the change in position of the measuring portion 38 in connection with the linear relationship between the spring travel of the spring 36 and the spring force of the spring 36. The end modules 14a, 14b of FIGS. 5 and 6 differ with regard to their measuring arrangement.

In FIG. 5, the end module 14a comprises a measuring portion 38 which is formed substantially coaxially to the spring 36, the sensor 24 being arranged orthogonally to the spring. A measuring slope 42 is provided on the measuring portion 38 on the side facing the sensor 24. If a higher gripping force now acts on the gripping surface 30, the gripping surface 30 is pushed toward the end module 14a and the measuring portion 38 is pushed against the spring 36. The sensor 24 detects the change in the distance a between the sensor 24 and the measuring portion 38 due to the provided measuring slope 42, as a result of which the evaluation unit 110 determines the gripping force acting on the gripping surface 30.

In FIG. 6, a spring 36 and a gripping surface 30 with axes parallel to one another are provided in the end module 14b, the gripping surface 30 being coupled to the spring 36 via the measuring portion 38. An increased gripping force pushes the gripping surface 30 toward the end module 14b, causing a movement of the measuring portion 38 toward the sensor 24. The sensor 24 is also aligned parallel to the axis of the spring 36 and measures the distance a to a measuring surface 44 of the measuring portion 38 arranged perpendicularly to the axis of the spring. The evaluation unit 110 determines the gripping force acting on the gripping surface 30 by means of the change in position of the measuring portion 38.

Figure 7:
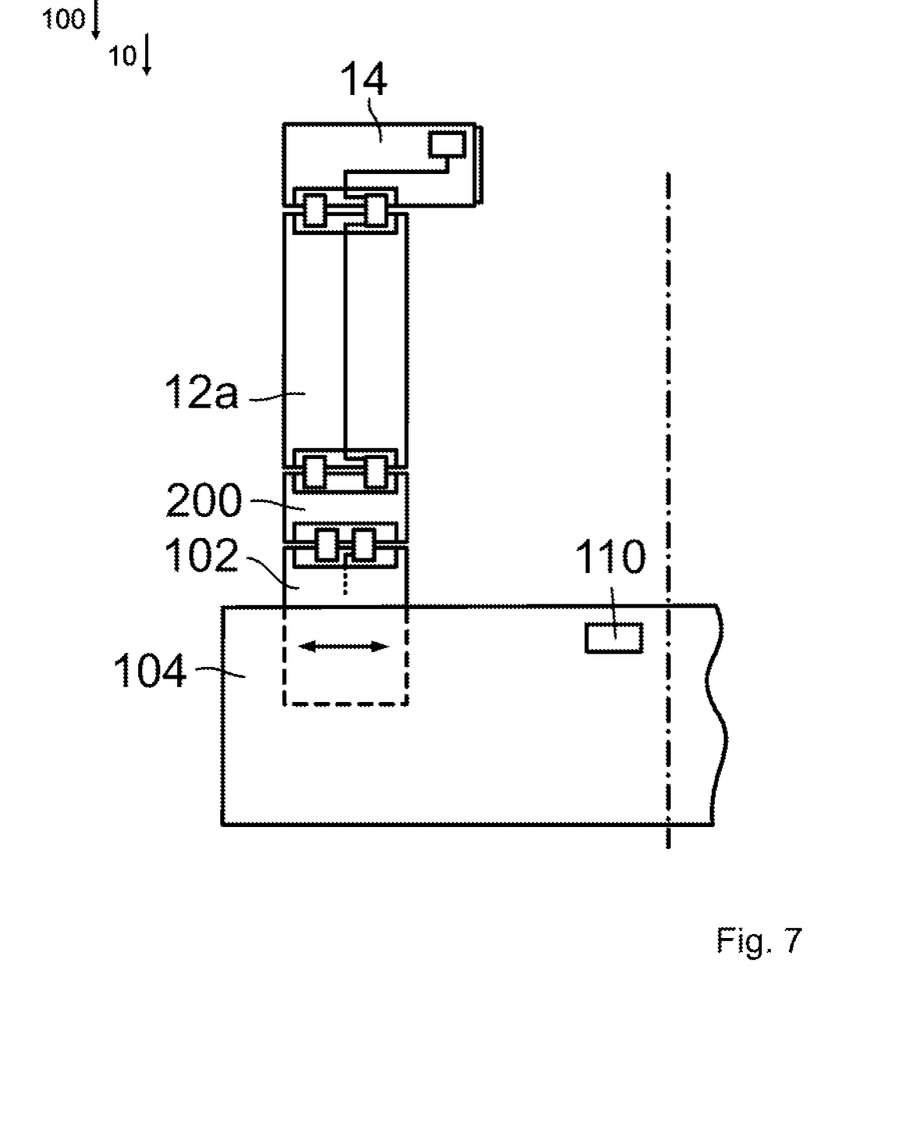
FIG. 7 is a schematic view of a gripping finger arranged on a gripper jaw with three finger modules, comprising an adapter module, a base module and an end module.

FIG. 7 shows a gripping device 100, the gripper jaw 102 having a jaw interface 108 which is not identical to the rear electrical interfaces 18 of the base modules 12a, 12b. Accordingly, the base modules 12a, 12b cannot be arranged directly with their front interfaces 16 on the jaw interface 108. Consequently, an adapter module 200 is arranged on the jaw interface 108 or between the jaw interface 108 and base modules 12a. The adapter module 200 serves to translate the interfaces, so that a base module 12a, 12b or an end module 14 can be connected to the jaw interface 108 by means of the adapter module 200.

The gripping fingers 10 shown in the drawings are designed free of evaluation units. The evaluation unit 110 is provided in the gripper housing 104. Alternatively, it is conceivable that it is provided in the gripper jaw 102. The evaluation unit 110 serves to evaluate and process the sensor data generated during operation. The evaluated and processed sensor data are retrieved by a higher-level gripping control or transmitted thereto.

The invention claimed is:

1. Modular gripping finger for arrangement on a movable gripper jaw of a gripping device, having at least two rigidly interconnected finger modules, the finger modules comprising one or more base modules for forming a geometric shape of the gripping finger and comprising an end module having a gripping surface, the end module comprising an electrical end module interface and at least one sensor which is or can be connected to the end module interface, characterized in that
   each base module comprises a front electrical interface facing the gripper jaw and a rear electrical interface facing away from the gripper jaw,
   the at least one base module being connectable via its rear electrical interface to the electrical end module interface,
   one or more connecting lines for transmitting energy and data being provided within each base module between the front electrical interface and the rear electrical interface in each case,
   the connecting lines connected to one another via the electrical interfaces forming a through line such that energy for operating the sensor and/or sensor data generated by the sensor can be transmitted between the electrical jaw interface and the electrical end module interface, and
   the front electrical interface and the electrical end module interface being identical in each case.

2. Modular gripping finger according to claim 1, wherein the finger modules further comprise an adapter module, wherein the adapter module comprises a front electrical interface and a rear electrical interface, wherein the adapter module can be connected via its front electrical interface to an electrical jaw interface on the gripper jaw side, wherein the rear electrical interface of the adapter module and the rear electrical interface of the at least one base module are identical.

3. Modular gripping finger according to claim 1, wherein the rear electrical interface and the electrical jaw interface are identical.

4. Modular gripping finger according to claim 1, wherein one or more base modules each has one or more sensors and/or one or more actuators.

5. Modular gripping finger according to claim 1, wherein the at least one sensor is designed for identifying a part that is gripped or to be gripped and for recording the gripping force exerted on the gripping surface by a gripped part, the position of the gripping surface in space, the distance between the gripping surface and a part to be gripped, the slippage between the gripping surface and the gripped part and/or the environmental conditions.

6. Modular gripping finger according to claim 1, wherein a media interface is provided within one or more base modules at the front electrical interface and at the rear electrical interface in each case and in that a media line for transferring substances and/or media is provided between the media interfaces.

7. Modular gripping finger according to claim 1, wherein the base modules can be frictionally connected to one another, to the electrical jaw interface and to the electrical end module interface by means of a mechanical quick-change system.

8. Modular gripping finger according to claim 1, wherein at least one sensor and/or at least one actuator are embedded in the finger modules by integration in an additive manufacturing process.

9. Modular gripping finger according claim 1, wherein the connecting lines are produced in an additive manufacturing process.

10. Modular gripping finger according to claim 1, wherein a sensor in the end module is designed in such a way that the spring travel of a spring coupled to the gripping surface is detected in order to record the gripping force acting on the gripping surface.

11. Modular gripping finger according to claim 1, wherein the end module and the at least one base module are designed free of evaluation units.

12. Gripping device comprising an evaluation unit, comprising at least one jaw having a jaw interface and comprising at least one modular gripping finger according to any of claims 1 to 10 arranged at the jaw interface,
   wherein the evaluation unit is integrated into the gripping device or is arranged thereon, and
   wherein the sensor data, generated during operation, of the at least one sensor of the at least one gripping finger (10) are processed by the evaluation unit wherein the gripping finger is adapted for arrangement on the at least one jaw of the gripping device, having at least two rigidly interconnected finger modules, the finger modules comprising one or more base modules for forming a geometric shape of the gripping finger and comprising an end module having a gripping surface, the end module comprising an electrical end module interface and at least one sensor which is or can be connected to the end module interface, characterized in that each base module comprises a front electrical interface facing the gripper jaw and a rear electrical interface facing away from the gripper jaw, the at least one base module being connectable via its rear electrical interface to the electrical end module interface, one or more connecting lines for transmitting energy and data being provided within each base module between the front electrical interface and the rear electrical interface in each case, the connecting lines connected to one another via the electrical interfaces forming a through line such that energy for operating the sensor and/or sensor data generated by the sensor can be transmitted between the electrical jaw interface and the electrical end module interface, and the front electrical interface and the electrical end module interface being identical in each case.

13. Gripping device according to claim 12, wherein the at least one sensor can be connected to the evaluation unit by means of the jaw interface.

14. Construction kit for providing a gripping finger with different finger modules, wherein the finger modules are provided in different shapes, sizes and materials, wherein the gripping finger is adapted for arrangement on a movable gripper jaw of a gripping device, having at least two rigidly interconnected finger modules, the finger modules comprising one or more base modules for forming a geometric shape of the gripping finger and comprising an end module having a gripping surface, the end module comprising an electrical end module interface and at least one sensor which is or can be connected to the end module interface, characterized in that each base module comprises a front electrical interface facing the gripper jaw and a rear electrical interface facing away from the gripper jaw, the at least one base module being connectable via its rear electrical interface to the electrical end module interface, one or more connecting lines for transmitting energy and data being provided within each base module between the front electrical interface and the rear electrical interface in each case, the connecting lines connected to one another via the electrical interfaces forming a through line such that energy for operating the sensor and/or sensor data generated by the sensor can be transmitted between the electrical jaw interface and the electrical end module interface, and the front electrical interface and the electrical end module interface being identical in each case.

\* \* \* \* \*